US010196184B2

(12) United States Patent
Keller

(10) Patent No.: US 10,196,184 B2
(45) Date of Patent: Feb. 5, 2019

(54) MANUAL CONTAINER SEALER AND METHODS

(71) Applicant: A-American Machine & Assembly Co., Rockford, IL (US)

(72) Inventor: Mark E. Keller, Durand, IL (US)

(73) Assignee: A-American Machine & Assembly Co., Rockford, IL (US)

( * ) Notice: Subject to any disclaimer, the term of this patent is extended or adjusted under 35 U.S.C. 154(b) by 1121 days.

(21) Appl. No.: 14/539,291

(22) Filed: Nov. 12, 2014

(65) Prior Publication Data

US 2016/0130046 A1 May 12, 2016

(51) Int. Cl.
| | | |
|---|---|---|
| *B65B 51/10* | (2006.01) | |
| *B65D 45/02* | (2006.01) | |
| *B65D 43/02* | (2006.01) | |
| *B65D 43/16* | (2006.01) | |
| *B65D 43/22* | (2006.01) | |
| *B65B 7/28* | (2006.01) | |

(Continued)

(52) U.S. Cl.
CPC .............. *B65D 45/02* (2013.01); *B29C 65/18* (2013.01); *B29C 66/112* (2013.01); *B29C 66/131* (2013.01); *B29C 66/742* (2013.01); *B29C 66/8161* (2013.01); *B29C 66/8165* (2013.01); *B29C 66/8167* (2013.01); *B29C 66/81427* (2013.01); *B29C 66/8221* (2013.01); *B29C 66/8324* (2013.01); *B65B 7/2871* (2013.01); *B65B 7/2878* (2013.01); *B65B 59/00* (2013.01); *B65D 43/02* (2013.01); *B65D 43/16* (2013.01); *B65D 43/22* (2013.01); *B29C 65/4825* (2013.01); *B29C 65/4835* (2013.01);

(Continued)

(58) Field of Classification Search
CPC ....... B65B 7/16; B65B 7/2842; B65B 7/2878;
B65B 9/00; B65B 9/04; B65B 51/10;
B65B 51/14; B65B 51/148; B29C 59/00;
B29C 59/04; B29C 65/00; B29C 66/53461; B29C 66/91421
USPC ............... 53/329.2, 329.3, 375.8, 375.9, 478
See application file for complete search history.

(56) References Cited

U.S. PATENT DOCUMENTS 2,649,392 A * 8/1953 Marshall ................. B29C 65/18
156/272.2
3,488,472 A * 1/1970 Pizarro ................... B29C 65/18
219/243

(Continued)

*Primary Examiner* — Andrew M Tecco
*Assistant Examiner* — Eyamindae Jallow
(74) *Attorney, Agent, or Firm* — Hinshaw & Culbertson LLP

(57) ABSTRACT

A self-aligning, pivotally engaging container sealing device is provided. The device comprises a base, a sealing head including an upper die member pivotally mounted relative to the base, and a lower die member supported by the base for free pivotal and vertical movement relative thereto. The lower die member is biased generally upwardly by a spring or other biasing mechanism, while permitted to tilt substantially freely about a generally horizontal axis. The device may be manually actuated by pivotally lowering the sealing head to operatively engage the die members. Initial contact by the descending upper die member on a part of the lower die member impels the lower die member to tilt into parallel alignment with the upper die member, before any significant force from the biasing member is transmitted through the lower die member to the upper die member to clamp and form a seal between a container flange and container cover located between the upper and lower die members.

15 Claims, 13 Drawing Sheets

(51) Int. Cl.
  *B65B 59/00* (2006.01)
  *B29C 65/18* (2006.01)
  *B29C 65/00* (2006.01)
  *B29L 31/00* (2006.01)
  *B29C 65/48* (2006.01)
  *B29C 65/78* (2006.01)

(52) U.S. Cl.
  CPC ...... *B29C 65/7802* (2013.01); *B29C 66/7392* (2013.01); *B29C 66/7422* (2013.01); *B29C 66/8242* (2013.01); *B29C 66/8244* (2013.01); *B29C 66/8322* (2013.01); *B29L 2031/712* (2013.01); *B65D 2543/00833* (2013.01)

(56) References Cited

U.S. PATENT DOCUMENTS

| | | | | |
|---|---|---|---|---|
| 3,507,093 A * | 4/1970 | Marion | ............... | B65B 7/167 493/109 |
| 3,724,161 A * | 4/1973 | Vermeulen | ............ | B65B 7/2885 53/329.2 |
| 3,759,013 A * | 9/1973 | Zimmermann | ......... | B29C 65/18 156/583.3 |
| 3,800,502 A * | 4/1974 | Vermeulen | ............. | B29C 65/48 53/329.2 |
| 4,437,292 A * | 3/1984 | Buri | ..................... | B65B 7/2878 53/324 |
| 4,930,288 A | 6/1990 | Juenkersfeld | | |
| 5,049,720 A * | 9/1991 | Fang | ..................... | B23K 26/12 219/121.63 |
| 5,109,653 A * | 5/1992 | Kubis | ................. | B29C 65/3656 156/380.2 |
| 8,266,869 B1 | 9/2012 | Liu | | |
| 2001/0000559 A1 | 5/2001 | De Young et al. | | |
| 2004/0020172 A1* | 2/2004 | Biba | ..................... | B26D 1/045 53/478 |
| 2004/0045257 A1* | 3/2004 | Bakker | ................ | B65B 7/2885 53/329.2 |
| 2004/0206048 A1* | 10/2004 | Iuchi | ...................... | B29C 65/18 53/329.2 |
| 2007/0107379 A1* | 5/2007 | Dewey | .................... | B65B 7/164 53/329.3 |

\* cited by examiner

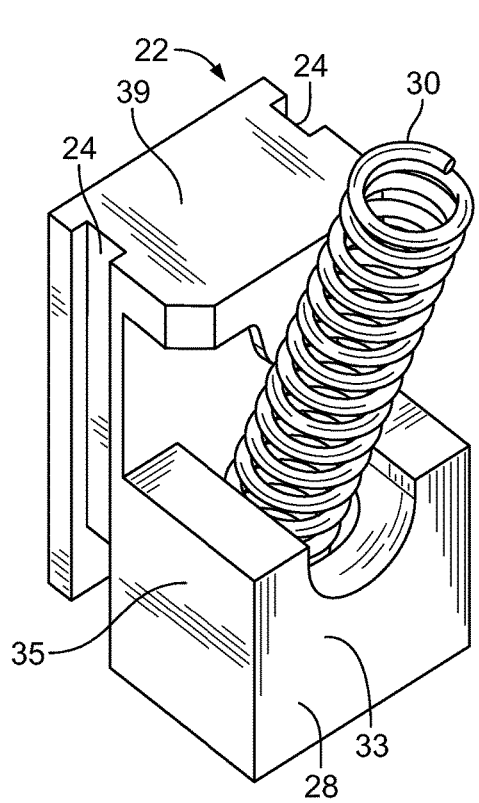 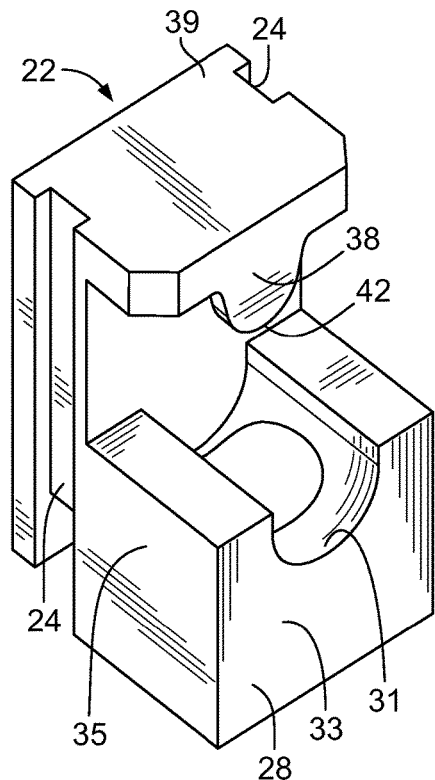
FIG. 9  FIG. 10
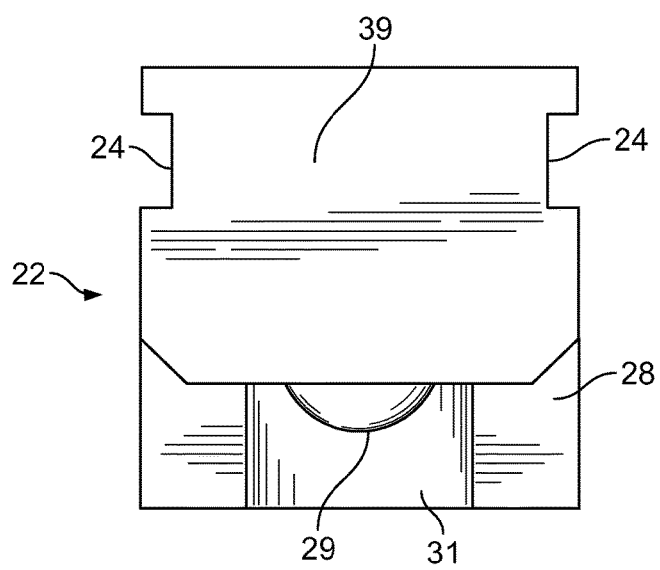
FIG. 11

MANUAL CONTAINER SEALER AND METHODS

FIELD OF THE INVENTION

The present invention relates to container sealers and methods of sealing containers. More particularly, it relates to container sealers for using pressure and/or heat to removably seal a cover onto a foodstuff container suitable for use by a consumer to transport and/or retain the foodstuff to be consumed at a later time, and methods of using the same to seal containers. Still more particularly, it relates to container sealers having a pivotally actuated upper die member, which may be manually or automatically actuated, and methods of using them to seal containers.

BACKGROUND

In manually operated sealing devices for sealing a cover, typically a die-cut cover that may comprise foil or plastic, for example, onto a container flange, an upper sealing head that pivotally flips open and closed has several advantages over an upper sealing head with purely vertical opening and closing movement, such as a sealing head that slides up and down on vertical shafts, for example.

In particular, a pivotal upper sealing head provides clearer overhead and lateral access to a lower die member when opened, for ease of placement of a container flange to be sealed; displaces the upper die member laterally (i.e., horizontally, transversely, or radially with respect to an axis extending through the respective centers of an upper die member and a lower die member) away from the lower die to make it easier for an operator to avoid accidentally touching an upper die which may be heated; and generally provides a simpler, more compact, and lighter sealing head connection to facilitate portability and efficient use of space, which typically comprises a single pivotal joint instead of a plurality of linear shafts arranged about a perimeter of the die.

However, in existing pivotally actuated container sealers, these advantages come only at the cost of sacrificing seal quality and/or uniformity, as the portion of the upper die member closest to the upper die pivotal axis contacts and begins to apply sealing pressure and, where applicable, heat, to a container cover and flange before other portions of the upper die member. This can result, for example, in undesirable deformation or misalignment of the container cover and flange, and/or a bonded area that extends across less than an entire transverse width of a flange region to be sealed at one or more locations around the flange perimeter.

A need exists for a pivotally actuated container sealing device capable of sealing a cover to a container flange more uniformly and completely than existing pivotally actuated container sealing devices. While pivotal die movement has particular advantages in a manual device as described above, improvements to seal quality, uniformity, and completeness in a pivotally engaging seal die assembly will also benefit automated sealing devices with pivotal die movement. A need also exists for a reliable and efficient container sealing device capable of sealing containers of different diameters and sizes.

SUMMARY OF THE INVENTION

According to an aspect of the invention, a container sealing device is provided, comprising a base, a lower die member movably supported by the base, and an upper die member mounted for pivotal movement relative to the base.

The lower die member is mounted for generally vertical translation relative to the base, between a home position and a lower die sealing position generally below the home position, and for pivotal movement, generally about a horizontal lower die pivotal axis, between an initial lower die alignment position at an initial die alignment angle and a sealing position at a sealing angle. A biasing mechanism provides a biasing force to bias the lower die member upwardly toward the home position when the lower die member is displaced below the home position. Thus, when the upper die member engages and pushes the lower die member below the home position, the biasing member provides a clamping force to press together a container flange and cover for the container that are retained between the die members.

The upper die member is pivotable to and from an upper die open position and an initial upper die alignment position, the upper die open position being at an inclined, open upper die angle higher than said initial die alignment angle, to permit placement of a peripheral container flange of a container and a cover for the container overlapping at least a portion of the container flange onto the lower die member, and removal of the sealed container comprising the container flange and cover from the lower die member, and the initial upper alignment position being at said initial die alignment angle. From the initial upper die alignment position, the upper die may be pivoted further down to an upper die sealing position, at a generally horizontal sealing angle lower than said initial die alignment angle. When in the upper die sealing position, the upper die member substantially uniformly engages the lower die member in the lower die sealing position. Thus, when a container flange and cover are disposed between an upper die sealing surface of the upper die member and a lower die sealing surface of the lower die member, a force from the biasing mechanism is applied to provide generally uniform clamping pressure to the container flange and cover between the upper and lower die sealing surfaces to permit uniform sealing of the cover to the container flange. The cover may be made in any suitable manner and may be die-cut. The cover may comprise foil (aluminum foil, for example) or plastic and may include an adhesive material or layer that can be heat activated.

In addition, in a lowering pivotal movement of the upper die member from the upper die open position toward the upper die alignment position, the upper die is configured to initially engage part of the lower die member when the lower die member is not initially disposed at the initial die alignment angle, and to impart movement to the initially engaged part of the lower die member to impel the lower die member to pivot to the initial die alignment angle as said lowering pivotal movement of the upper die member approaches the initial die alignment angle. During this phase of movement between initial engagement and initial alignment, the lower die member resists tilting with only a minimal amount of force if any, to avoid premature or uneven sealing of an initially contacted portion of a container cover and flange. For example, tilting of the lower die member from its home position to its initial alignment position may be resisted by a slight compressive restoring force from one side of one or more helical springs generally located at the axis of tilting of the lower die member, and/or by a small frictional force, such as between the lower die member or its support assembly and an upper stop member (provided in the illustrated embodiment as a rib of a mounting bracket that mates with a notch of a lower die support member). Such a restoring and/or frictional force is advantageously sufficient to hold the lower die member steady during placement and alignment of a container flange and cover thereon, while at the same time being small enough to avoid causing non-uniform sealing at or near an initially contacted portion of the container flange and cover. For example, rippling, deformation, dislocation/misalignment, and/or excessive melting of the cover and/or flange (in the case of a device with a heated upper die member for sealing under combined heat and pressure), and other effects of uneven magnitude or duration of sealing pressure that may cause the sealed region to be narrower and/or the seal to be weaker in some locations than others, or may otherwise negatively affect the appearance or function of the seal, are substantially avoided, thanks to the minimally resistive self-alignment mechanism of the die members.

As mentioned above, in one embodiment, the sealing device further comprises a lower die support member movably mounted to the base, the lower die support member configured to retain and guide said lower die member through its vertical and pivotal movements. Advantageously, this permits the manual exchange of the lower die member for at least one alternate lower die member (corresponding to an alternate container flange and/or cover to be sealed) to be received in and supported by the lower die support member. In this case, the upper die member typically comprises a plurality of upper die sealing surfaces, the upper die sealing surfaces configured to alternately engage complementary respective sealing surfaces of said lower die member and said at least one alternate lower die member. The plurality of upper die sealing surfaces may be stepped, non-overlapping, narrow-banded, generally planar and generally parallel surfaces, each upper die sealing surface at least substantially surrounding an open interior area in its respective plane, and the surfaces having a range of sizes. In this case, the open interior area defined by each larger upper die sealing surface generally overlaps and is disposed lower relative to the upper die member than any smaller upper die sealing surface. This avoids contact between the smaller upper die sealing surface(s) and a container cover in contact with the larger upper die sealing surface, advantageously preventing heat degradation of the cover (again, in case the upper die member is heated, which is an optional feature according to the invention), which may, for example, have a printed design on its top surface, misalignment of the cover or poor seal quality due to downward displacement of its central region causing its periphery to be pulled in, and/or undesired heating of an interior region of the cover, such as may undesirably raise the temperature of the contents of the container.

In addition, the lower die support member may itself be removably connected to the base for toolless removal and reassembly, thus facilitating cleaning and maintenance of the device. The toolless connection between the removable lower die support mount and the base may, for example, be provided by at least one mounting bracket slidingly received by and frictionally retained with respect to a wall of the countertop-engaging device support member, the biasing mechanism being disposed to transmit the biasing force between the mounting bracket and the lower die support member. A mating contact connection between the lower die support mount and the mounting bracket, such as that of a curved-profile rib seated in a curved-profile slot that is slightly wider than the rib, may guide the tilting or rocking movement of the lower die member as it comes into initial alignment with the upper die member.

In another embodiment, the lower die member further comprises a lower die positioning ring protruding upwardly from the lower die member and having an inner wall with a perimeter complementary to an outer perimeter of a container cover to be sealed, to receive and restrict transverse movement of said container cover. Thus, the positioning ring helps to guide the placement of the cover in proper alignment with the container flange and to retain the cover and flange in proper alignment. In this case, where the upper die sealing surface is comprised in an upper die sealing ring protruding downwardly from the upper die member, the upper die sealing ring may extend into the interior of the lower die positioning ring when the dies are engaged and aligned. According to this arrangement, the lower die positioning ring generally surrounds an area containing an outer wall of said upper die sealing ring to define a transverse clearance between the lower die positioning ring and the upper die sealing ring. This clearance permits a limited amount of relative transverse movement of the upper and lower die members when the upper and lower die members are aligned, as well as permitting the insertion of the upper die sealing ring into the lower die member before the dies attain parallel alignment. In a still more particular embodiment, the lower die positioning ring has spaced apart ends defining a tab positioning gap sized and shaped to receive and retain a tab of said cover at a fixed angular position with respect to a generally vertical axis.

According to another aspect of the invention, a method of sealing a container using a container sealing device substantially as described above is provided. The method includes the steps of pivoting the upper die member to an open upper die position at an open upper die angle inclined with respect to a horizontal plane; placing a peripheral container flange and a cover for the container overlapping at least a portion of the container flange onto a lower die sealing surface of the lower die member; lowering the upper die member to contact a part of the lower die member at an initial contact angle higher than the initial die alignment angle; lowering the upper die member from the initial contact angle to the initial die alignment angle to cause the upper die member to impart movement to the initially contacted part of the lower die member to impel the lower die member to pivot to the initial die alignment angle; lowering the upper die member to a sealing position at a generally horizontal upper die sealing angle, to engage said container flange and cover between the upper and lower die members in the lower die sealing position; applying a force from the biasing mechanism to generally uniformly compress the container flange and cover between the upper and lower die sealing surfaces to seal the cover to the container flange to produce a sealed container; raising the upper die member to the open upper die position; and removing the sealed container from the lower die member.

As noted above, the method may or may not include providing heat to the upper die sealing surface of the upper die member, and applying heat from the upper die sealing surface to the cover to promote sealing of the cover to the container flange. The optional application of heat at the sealing region may either enhance sealing by other means, such as when an adhesive material is applied to the contacting surfaces of the container flange and cover, the adhesive properties of the material being enhanced by but not strictly requiring heat to be activated. Alternatively, heat may provide the principal or sole mechanism of sealing. For example, in the illustrated embodiment, sealing is provided by bonding, fusing or otherwise attaching a portion of a top surface of a plastic container flange to bond the container flange to the cover, which may be a metallic foil cover, such as an aluminum foil cover or a cover of any suitable desired material, including a plastic material, for example. In another example, the seal may be provided by a high melting temperature adhesive which must be heated well above a standard room temperature to be activated.

BRIEF DESCRIPTION OF THE DRAWINGS

FIG. 9 is a top perspective view of a lower die support ring mounting bracket with a helical spring partially inserted therein.

FIG. 10 is a top perspective view of the bracket as shown in FIG. 9 with the spring removed.

FIG. 11 is a top plan view of the bracket as shown in FIG. 10.

DETAILED DESCRIPTION OF THE INVENTION

Figure 1:
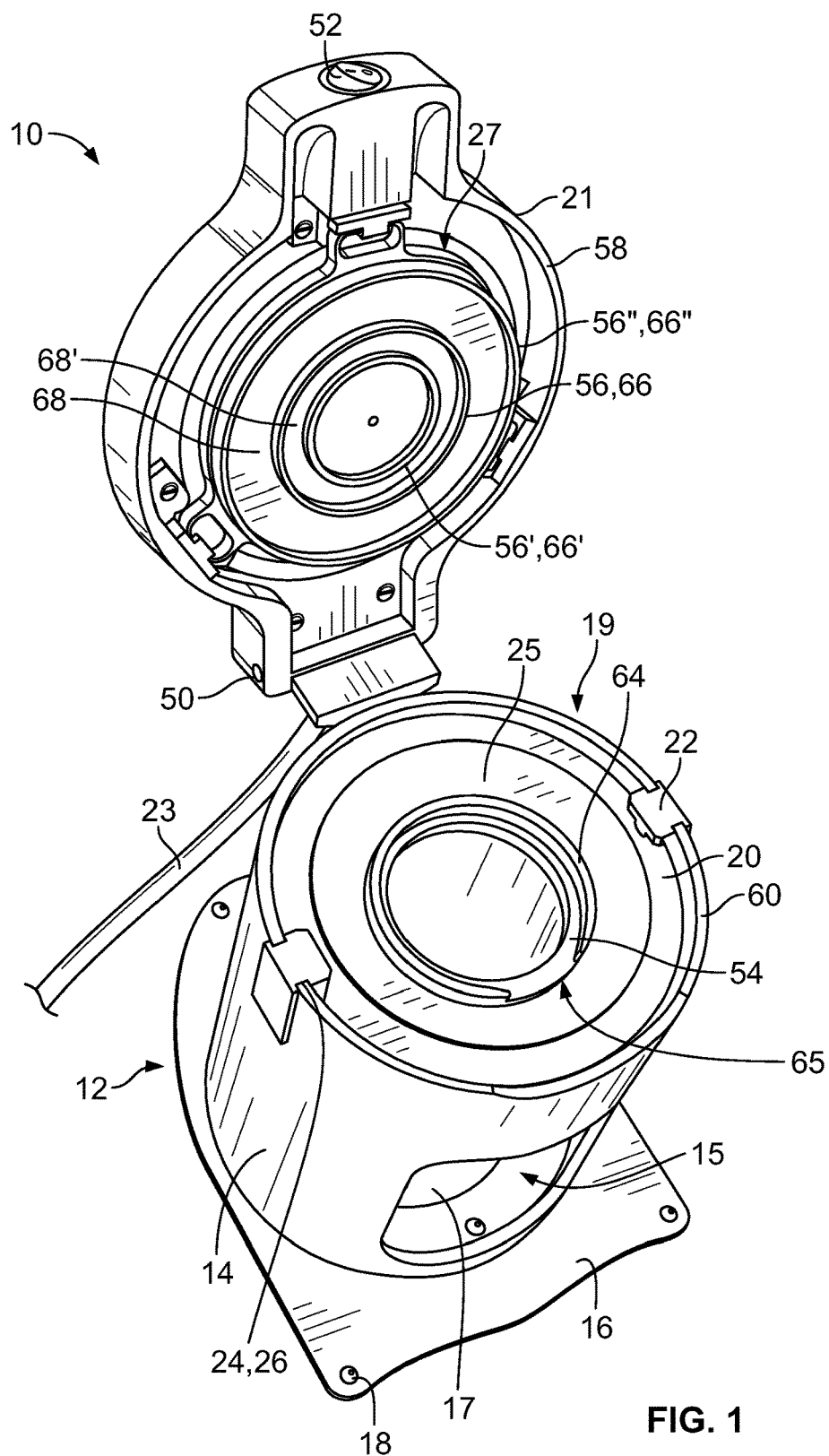
FIG. 1 is a top perspective view of a sealing device according to an aspect of the invention in an open position.
Figure 2A:
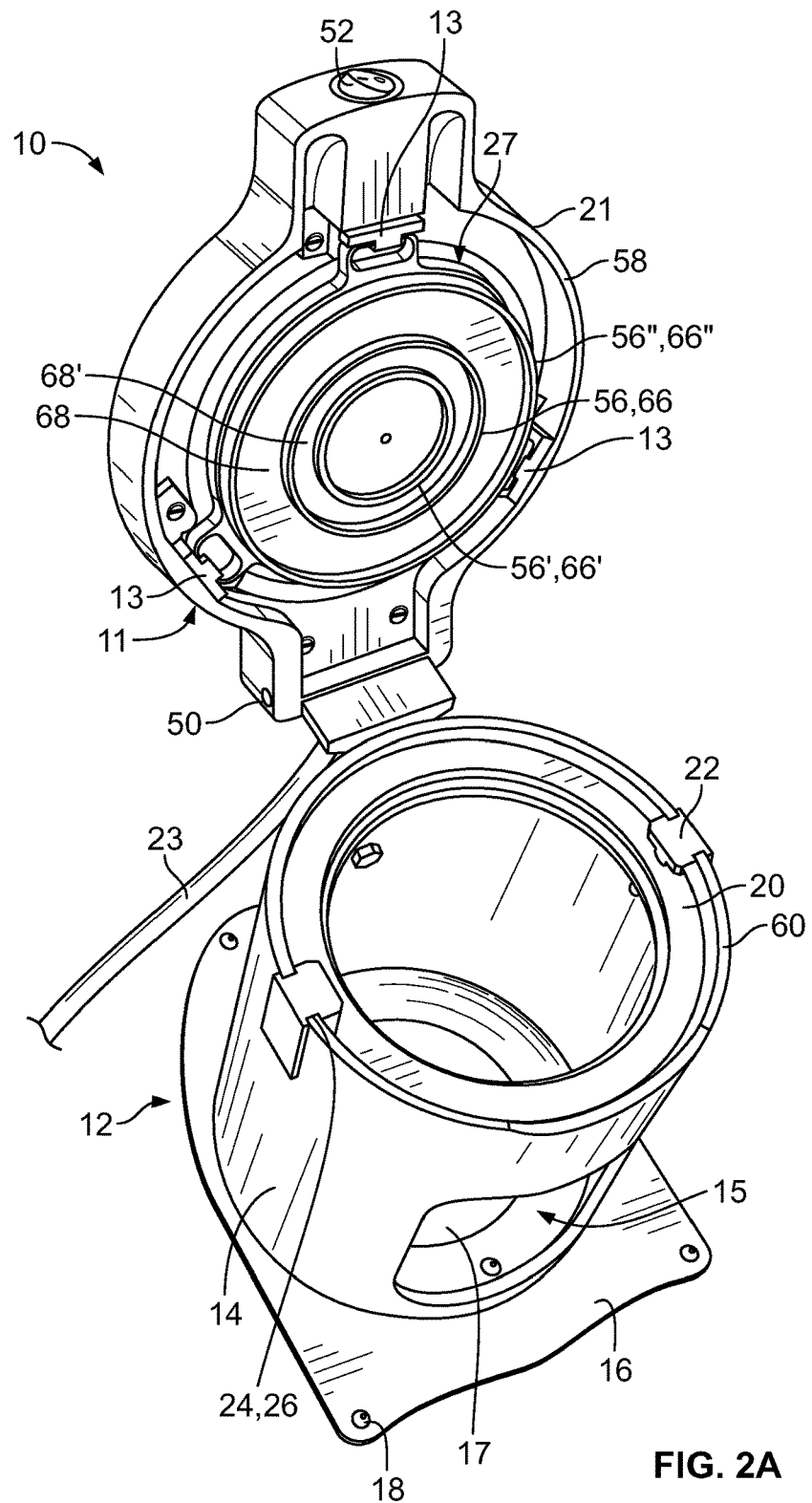
FIG. 2A is a top perspective view of the sealing device shown in FIG. 1, with an exchangeable lower die removed therefrom.
Figure 2B:
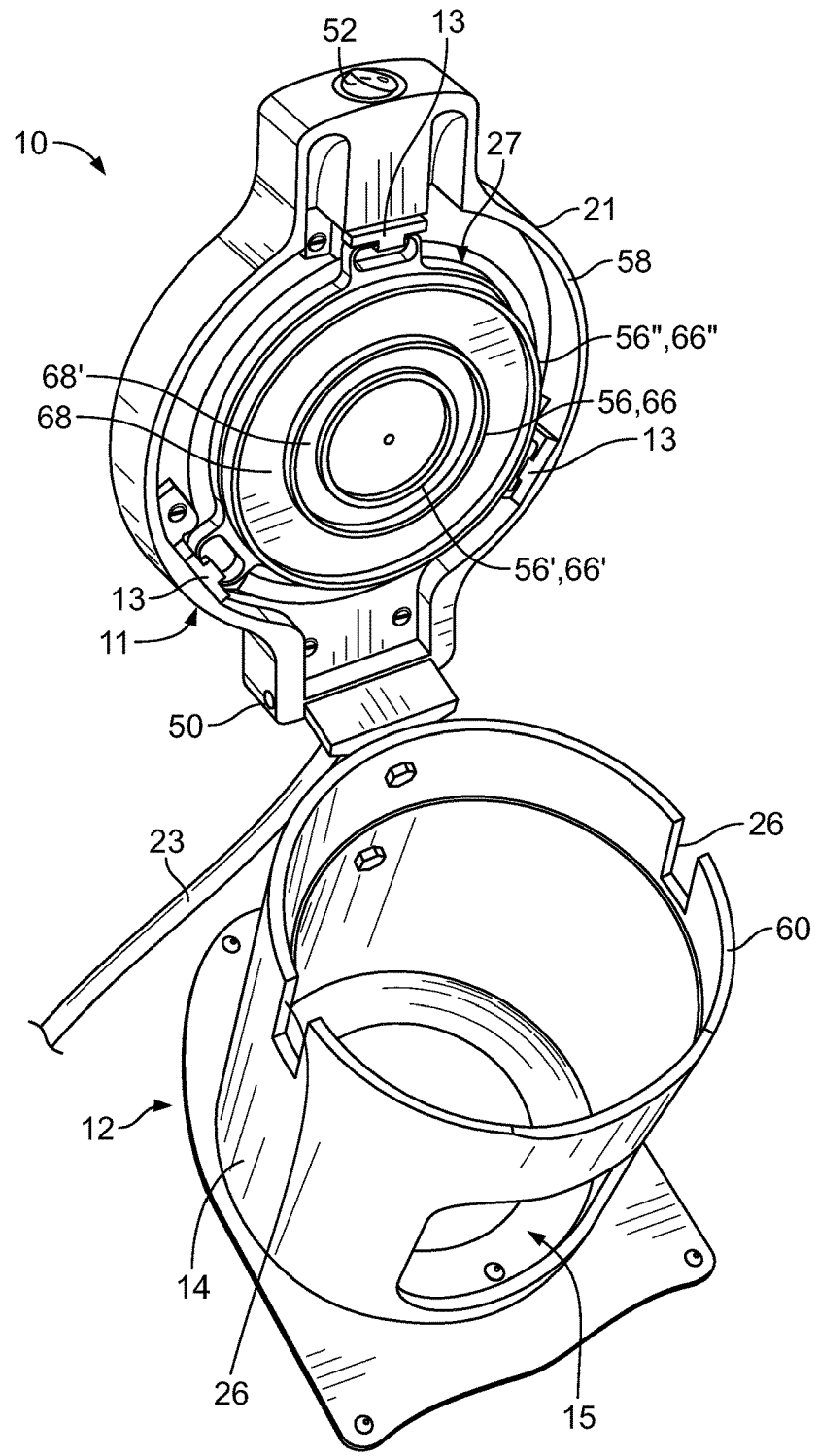
FIG. 2B is a top perspective view of the sealing device as shown in FIG. 2A, with a lower die support assembly also removed therefrom.
Figure 3:
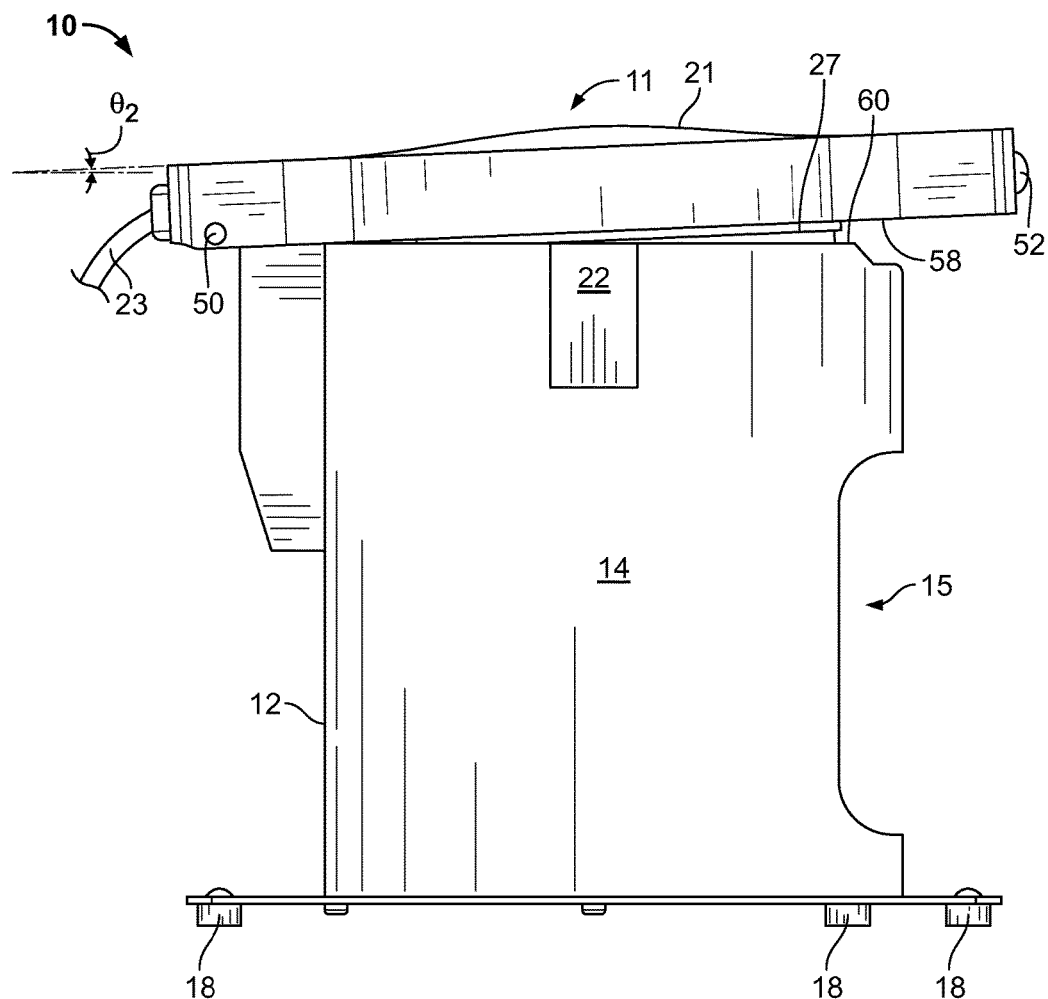
FIG. 3 is a side elevation view of the sealing device of FIG. 1 in a partially closed position.

Manual container sealers and methods of using them to seal containers according to the invention are described with reference to the accompanying figures, where like reference numerals represent like elements. Manual container sealers according to the invention may be advantageously used in a restaurant, business, home or other desired setting. Furthermore, while the illustrated embodiments of the invention are manually operable container sealers, combinations of features according to the invention, such as those that permit the attainment of initial parallel die alignment under a low actuation force, may also be employed in automated sealers without departing from the scope of the invention.

Illustrated in FIG. 1 is a manual container sealing device 10 according to an embodiment of the invention. Device 10 includes a base 12, a lower die assembly 19 comprising a lower die member 25 movably mounted to base 12, and an upper die assembly 11 comprising a sealing head 21 housing an upper die member 27, retained by retention members 13. Sealing head 21 is pivotally mounted to base 12. Base 12 comprises a generally cylindrical vertical wall structure 14 attached to a base flange 16 with non-skid feet 18, to facilitate stably placing device 10 on a countertop or other generally flat, horizontal working surface for use of device 10, and may be any suitable shape as desired. Wall structure 14 includes a frontal opening 15, through which interchangeable lower die members not in use may conveniently be passed and stored within base 12. Base flange 16 includes a central opening 17, which may accommodate sealing tall containers whose bottoms extend through opening 17 when their upper flanges rest on lower die member 25. Sealing head 21 is shown connected to an electrical power cord 23, which may supply electrical voltage and current from any suitable source, such as a building wall outlet, to power a heat source within sealing head 21. Lower die assembly 19 includes a lower die support ring 20 movably mounted within and near the top end of base 12 by a pair of support ring mounting brackets 22 connected to base 12 and to support ring 20 generally at opposite ends of a diameter thereof.

Preferably, brackets 22, shown in detail in FIGS. 9-11, are adapted for toolless manual mounting and removal to and from base 12. In the illustrated embodiment, brackets 22 include lateral grooves 24 to facilitate sliding into and out of notches 26 formed in wall structure 14. As shown, each bracket 22 includes a bracket base 28 with an interior cavity 29 for receiving and retaining a lower end of a helical spring 30, although any suitable type of biasing member, such as leaf spring, flat spiral spring, gas spring, or magnet, and any suitable adaptations to retain and deploy it under compressive, tensile, bending, or torsional stresses, for upwardly biasing a support ring or other suitable lower die support mount are within the scope of the invention. To facilitate insertion of spring 30 into cavity 29, each bracket 22 includes a rounded channel 31 extending through the thickness of a front wall 33 thereof to meet cavity 29, a pair of side walls 35 of each bracket 22 being higher to guide the insertion of and to retain spring 30. To complete the insertion of spring 30 from the partially inserted position shown in FIG. 9, a user may seat the upper end of spring 30 in a depression 34 formed in a bottom surface of lower die support ring 20 and press down on support ring 20 to compress spring 30 to its preloaded length, and then slide support ring 20 into assembled engagement with bracket 22. Preferably, channel 31 has a substantially circular arcuate profile with a radius of curvature equal to or greater than the outer radius of spring 30. A rear wall 37 extends along the full height of each bracket 22 and the full length of its respective channels 24, which also corresponds to the vertical dimension of notches 26, so that a top wall 39 of each bracket 22 is substantially flush with an upper end surface 60 of base 12. Brackets 22, springs 30, and support ring 20 assemble together to form a lower die support mount assembly 32, depicted in FIG. 6.

Figure 8:
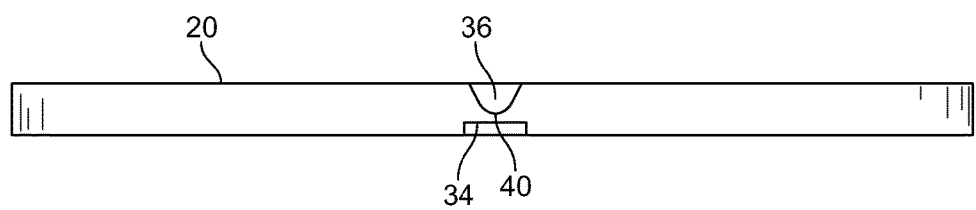
FIG. 8 is a side elevation view of the lower die support ring shown in FIG. 7.

When support mount assembly 32 is assembled, an upper end of spring 30 is seated in depression 34 as mentioned above, urging a pivotal notch 36 opposite depression 34 in a top surface of support ring 20 against a mating pivotal rib 38 of bracket 22. As shown in FIGS. 8 and 10, respectively, pivotal notch 36 and pivotal rib 38 may include respective complementary circular arcuate bottom surfaces 40, 42 of the same radius of curvature, notch 36 tapering outward from its bottom surface 40 to a wider dimension than rib 38, thus permitting support ring 20 freedom to rock back and forth about a generally horizontal lower die pivotal axis extending through the centers of the complementary arcs. An alternative bottom surface (not shown) of notch 36 may instead have a larger radius than bottom surface 42 of rib 38 (not shown), to permit some lateral displacement of notch 36 on rib 38 as desired. One potential benefit of such a loose fit of rib 38 in notch 36 is to reduce the amount of transverse/lateral play that may be needed between upper and lower die members 27, 25 to permit them to passively obtain alignment when initially engaging in relatively tilted orientations, as referred to below with respect to a transverse clearance between upper die sealing rings 66, 66', 66" and lower die positioning rings 64, 64', 64".

Figure 6:
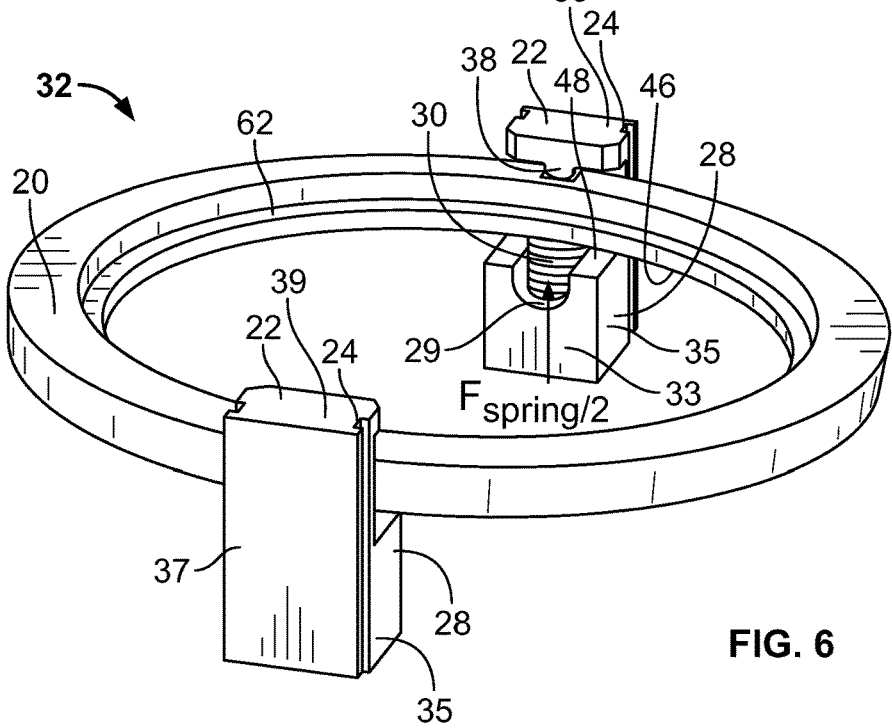
FIG. 6 is a top perspective view of a lower die support assembly of the sealing device of FIG. 1.
Figure 7:
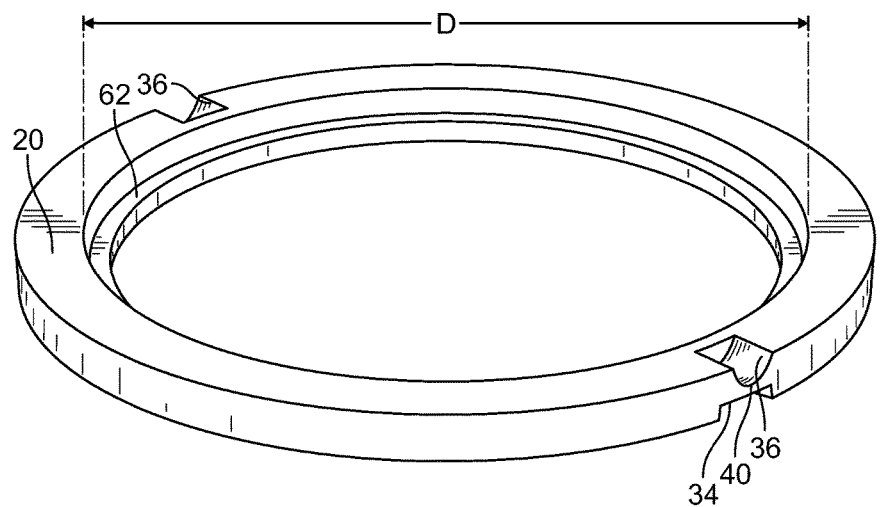
FIG. 7 is a top perspective view of a lower die support ring of the sealing device of FIG. 1.

In addition to the pivotal movement permitted by the mating of notch 36 with rib 38, support ring 20 is also permitted a range of vertical movement by a clearance between the underside 46 of support ring 20 and a top surface 48 of a lower portion of each bracket 22 that retains a corresponding spring 30. Thus, when a downward force is applied to a lower die member 25 seated in support ring 20, the downward reaction force to counter an upward biasing force $F_{spring}$ of springs 30 (represented in FIGS. 6 and 19 as $F_{spring}/2$ for one of the two springs 30) is shifted from ribs 38 to lower die member 25, until the reaction force from ribs 38 is reduced to zero, at which point all of the downward reaction force is shifted from ribs 38 onto lower die member 25. The downward force on lower die member 25 required to unburden ribs 38 is approximately equal to $F_{spring}$; discounting the respective weights of lower die member 25 and ring member 20, which are typically insignificant compared to the biasing force in the context of devices according to the invention. It should also be noted that springs 30 are preferably preloaded in compression, the relaxed length of spring 30 depicted in FIG. 9 being significantly longer than its maximum length when retained within assembly 32 as shown in FIG. 6. Thus, further compression of springs 30 in normal use of device 10 is relatively small compared to the distance by which they are already compressed to assemble assembly 32, and so the upward biasing force on support ring 20 provided by springs 30 remains essentially constant.

With reference to FIGS. 1-5, 17 and 18, the structure and operation of sealing head 21 will now be described and illustrated. Sealing head 21 houses and retains upper die member 27 in fixed relation thereto and is pivotally connected to base 12 by any suitable pivotal joint 50 defining a pivotal axis parallel to the lower die pivotal axis, to facilitate the passive alignment of upper die member 27 with lower die member 25 when sealing head 21 is lowered, as well as the tandem rotation of upper die member 27 in alignment with lower die member 25 from an initial alignment angle to a substantially horizontal sealing position, as described below in greater detail.

The operation of device 10 will now be described. Sealing head 21 begins in an open position, as shown in FIG. 1. Heating of upper die member 27 is preferably initiated in this position (for example by flipping a switch 52 to the on position), so that lower die member 25 is initially at room/ambient temperature and will not prematurely begin to heat the flange of a container placed on it before sealing head 21 is lowered. However, it should also be noted that, while device 10 is a sealer that uses both heat and pressure, to conveniently seal a metal foil cover FO to a suitable plastic container flange FL by bonding or fusing a portion of the container flange material without the need to apply a separate adhesive, the present invention may also advantageously be applied to the field of sealing covers to containers by applying pressure to a pressure-sensitive adhesive between the covers and the containers. Before, during, or after preheating of upper die member 27, a container such as container C containing contents L to be sealed, typically a liquid or viscous food substance such as a beverage, condiment, dressing, sauce, soup, dip, yogurt, custard, or pudding, and a cover such as a metallic foil cover FO shown in FIGS. 17-19 may be placed on lower die member 25, and then sealing head 21 may be lowered to carry out a sealing operation.

Figure 17:
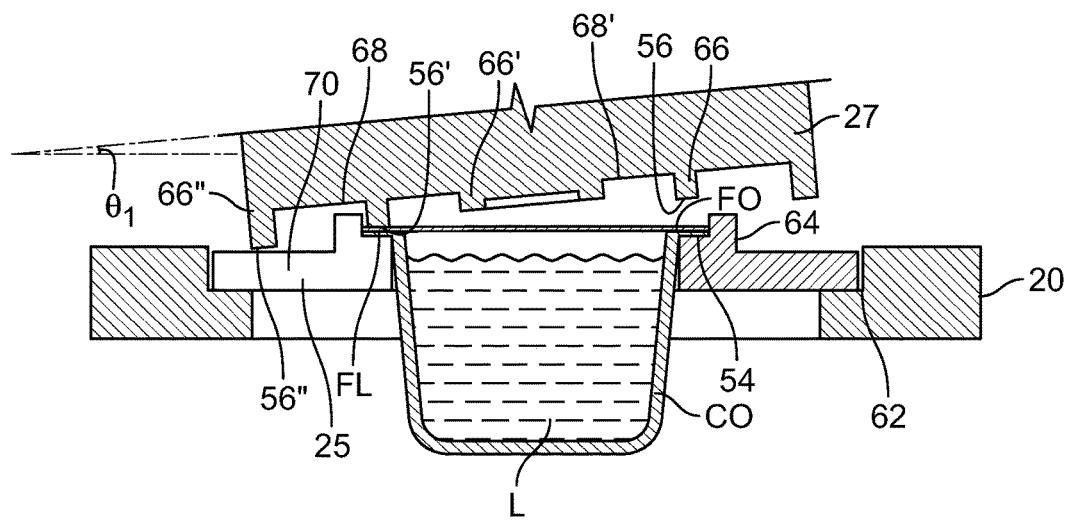
FIG. 17 is a cross-sectional side elevation view of upper and lower die members, a lower die support ring, and a container and cover to be sealed, shown at an example of an initial engagement position.
Figure 18:
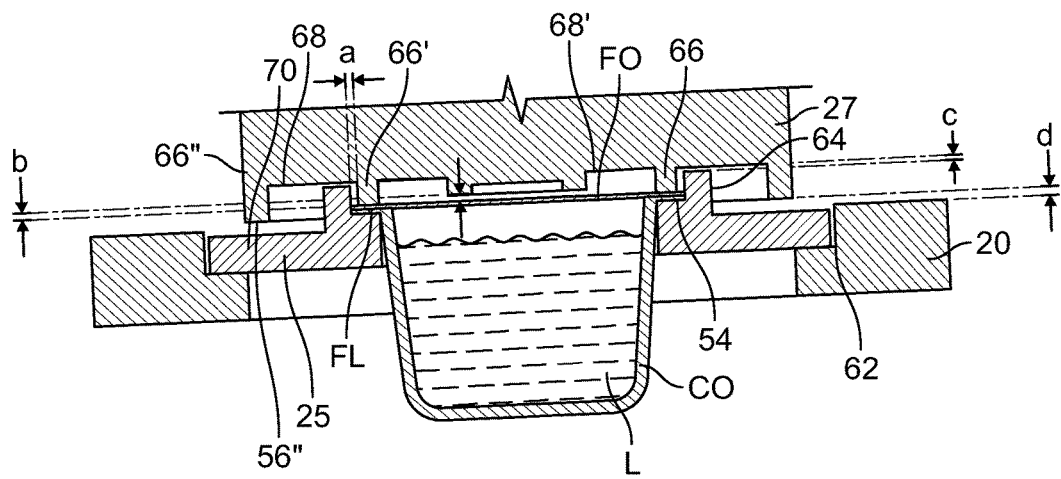
FIG. 18 is a cross-sectional side-elevation view of the components of FIG. 17, shown at an example of an initial alignment and full/uniform engagement position.

"Phases" of closing movement of sealing head 21 in the sealing operation of device 10 will now be described. However, it should be noted that an operator of device 10 need not be conscious of phases of movement of sealing head 21, and may generally close sealing head 21 in a continuous or intermittent motion as desired. In a first phase of movement, sealing head 21 is lowered to a position of initial engagement of upper die member 27 with lower die member 25, at an angle $\theta_1$ as illustrated in FIG. 17, showing certain sealing die components in cross section with container C and foil cover FO. "Engagement" in this context refers to any relationship through which force or movement of an upper die member imparts force or movement to a lower die member, and, for example, may refer either to direct contact of an upper die member on a part of a lower die member or to contact of an upper die member on a part of a container or container cover placed on the lower die member. Sealing head 21 is then further lowered to an initial alignment position at a second angle $\theta_2$, depicted in FIGS. 3 (side elevation of device 10) and 18 (fragmentary cross sectional view as in FIG. 17) at which upper die member 27 and lower die member 25 first attain parallel alignment and substantially uniform engagement, the engagement in the illustrated case being engaging contact of upper die member 27 on foil cover FO to impart movement and force/pressure through foil cover FO and container flange FL to lower die member 25 around the entire perimeter of container flange FL. From the initial engagement position to the initial alignment position, and at the initial alignment position, substantially no force from springs 30 is applied to compress container C and cover foil FO between lower die sealing surface 54 and upper die sealing surface 56, because springs 30 are located approximately along the pivotal axis of lower die support ring 20 and are thus compressed by pivoting of support ring 20. In this manner, the present invention permits a container sealer and method in which uniform sealing is promoted by applying at most a negligible amount of pressure to a container flange and cover until parallel alignment and flush engagement are attained, so that no portion of a region to be sealed begins to seal significantly before any other portion. That the pressure at and approaching the alignment angle is "negligible" does not mean that container C and cover foil CL are necessarily incapable of sealing together under the pressure applied at the initial alignment position, but only that this pressure is so much smaller than biasing force F that heat sealing under this pressure takes significantly longer than under biasing force $F_{spring}$. Therefore, inadvertent uneven sealing during the closing movement of sealing head 21 between initial contact and initial alignment of upper die member 27 and lower die member 25 will not occur when an operator closes sealing head 21 in a smooth, natural manner, pausing, if at all, only when increased resistance is felt at the initial alignment position.

Figure 4:
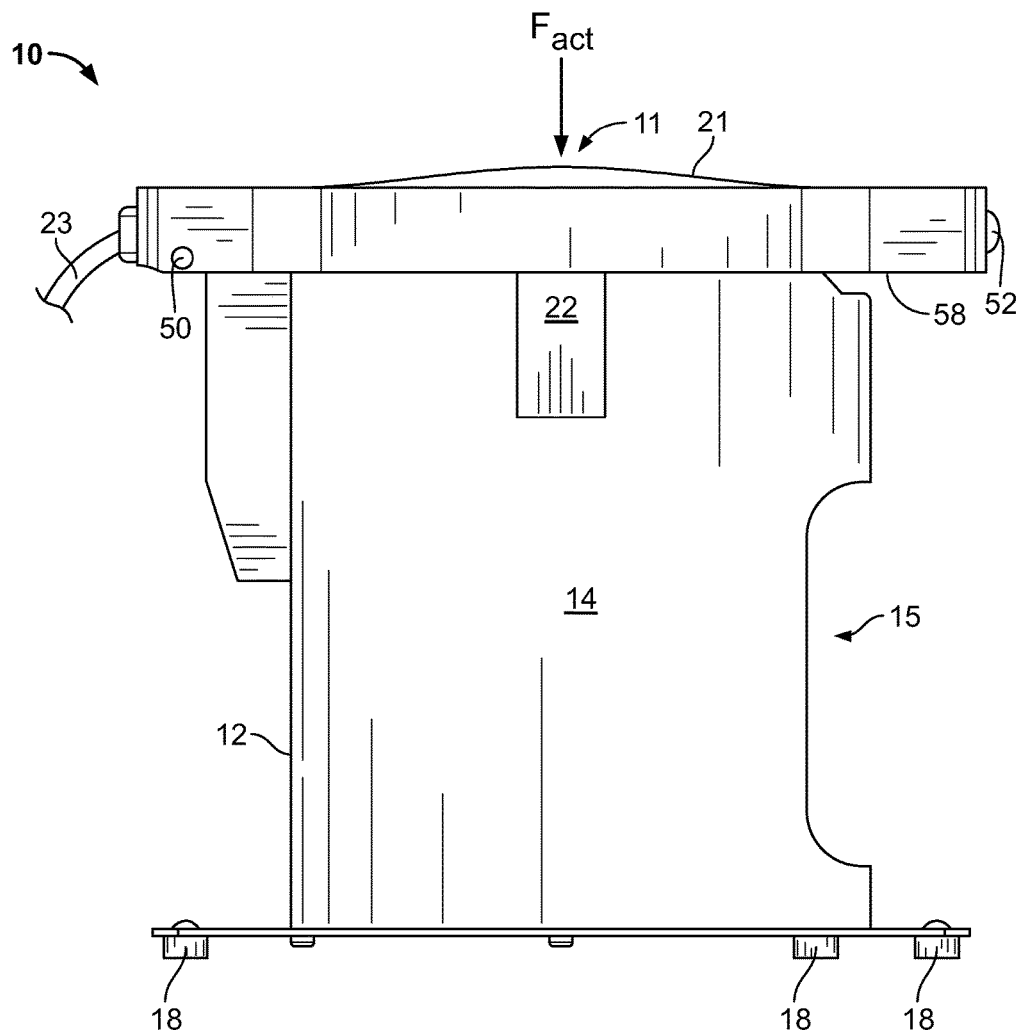
FIG. 4 is a side elevation view of the sealing device of FIG. 1 in a fully closed position.
Figure 5:
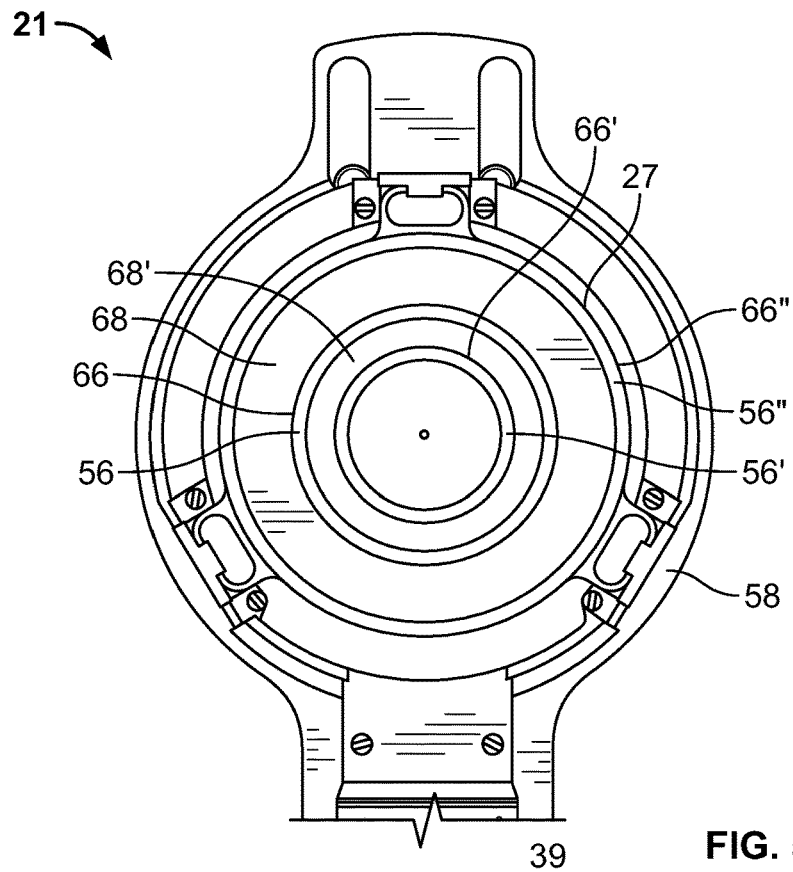
FIG. 5 is a bottom plan view of a sealing head of the sealing device of FIG. 1.
Figure 19:
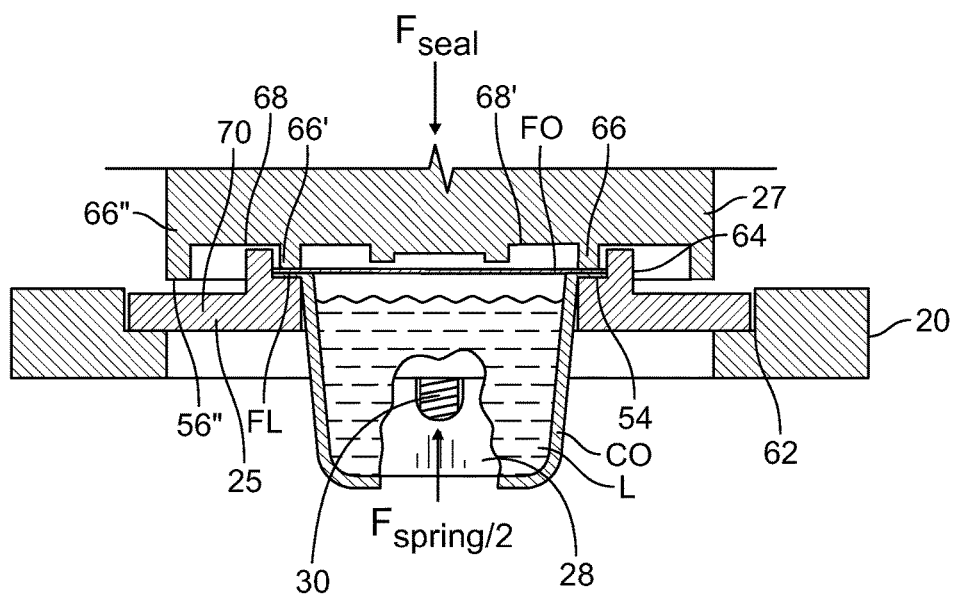
FIG. 19 is a cross-sectional side-elevation view of the components of FIG. 18, shown at an example of a sealing position.
Figure 20:
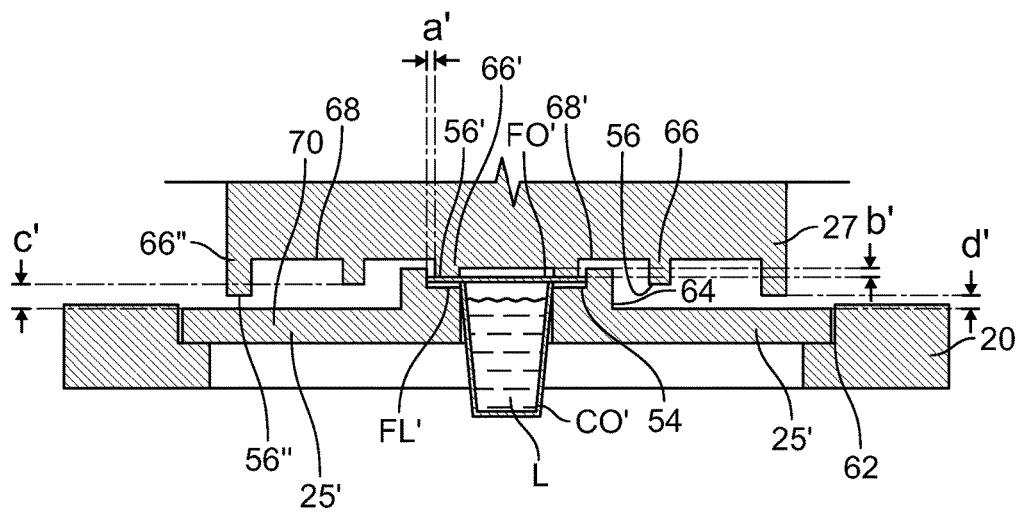
FIG. 20 is a cross-sectional side-elevation view of the components of FIG. 19 with an alternate exchangeable lower die member substituted, shown at another example of a sealing position.

In a final phase of motion, sealing head 21 is then lowered from the initial alignment position to the sealing position shown in FIGS. 4 and 19, by the application of an actuation force, which in the preferred embodiment may be applied manually by a user simply pressing a hand down on top of sealing head 21 to produce an actuation force $F_{act}$ shown in FIG. 4. In other embodiments (not shown), actuation force $F_{act}$ may instead be applied by a pneumatic or hydraulic cylinder, a magnet, an electric motor (not shown), or other suitable prime mover (not shown), either in a pre-programmed manner or in response to contemporaneous human instructions. In the sealing position, a sealing force $F_{seal}$ is applied to container C and cover foil FO. To the extent that the actuation force $F_{act}$ is greater than biasing force $F_{spring}$, excess force is transmitted through a lower wall surface 58 of sealing head 21 contacting an upper end surface 60 of base 12 at the sealing position. This prevents further downward movement of sealing head 21 past the sealing position, at which point support ring 20 is still displaced above bracket base 28, thus limiting the magnitude of sealing force $F_{seal}$ to approximately that of biasing force $F_{spring}$, discounting the respective weights of lower die member 25 and support ring 20 as noted above. Depending on the type of sealing material, sealing head 21 is held in the sealing position for a relatively short time, typically about 1 to about 3 seconds, while heat from upper die 27 and clamping pressure between upper and lower die members 27 and 25 are applied to foil cover FO and container flange FL. After foil cover FO is sealed to flange FL, head 21 is lifted to permit removal of a sealed container C, and the sealed container C is removed.

Figure 12:
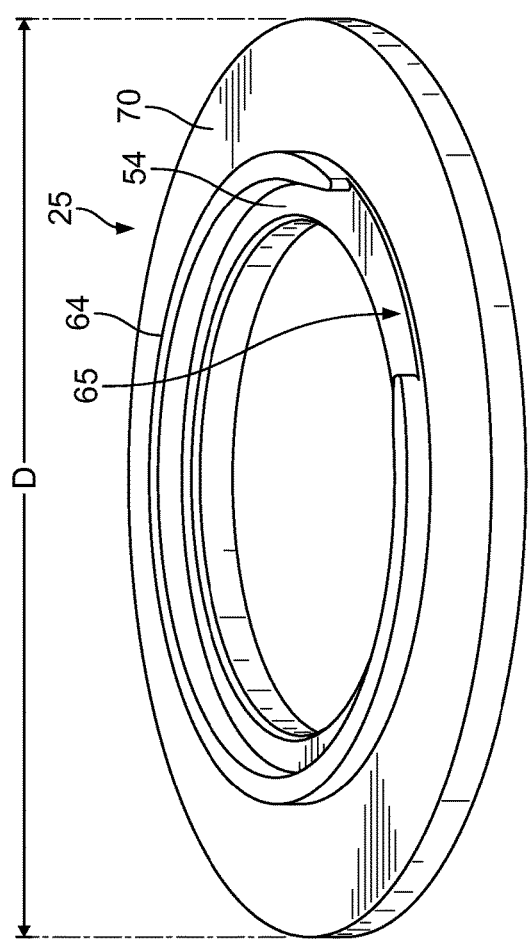
FIG. 12 is a top perspective view of the exchangeable lower die member shown with the sealing device depicted in FIG. 1.
Figure 13:
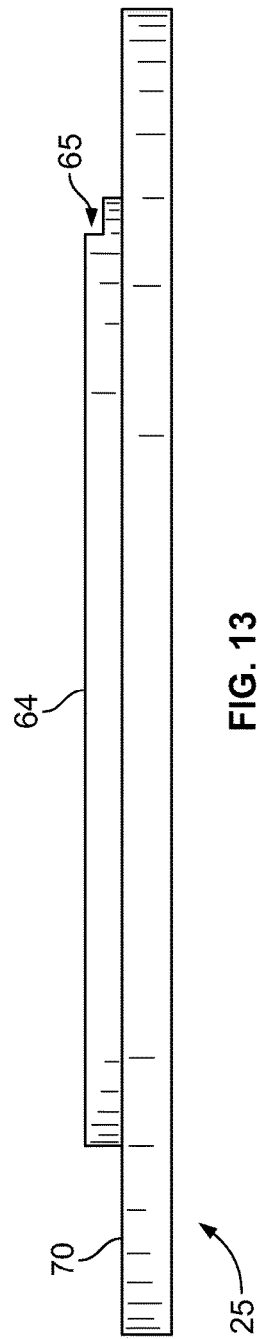
FIG. 13 is a side elevation view of the exchangeable die member shown in FIG. 12.
Figure 14:
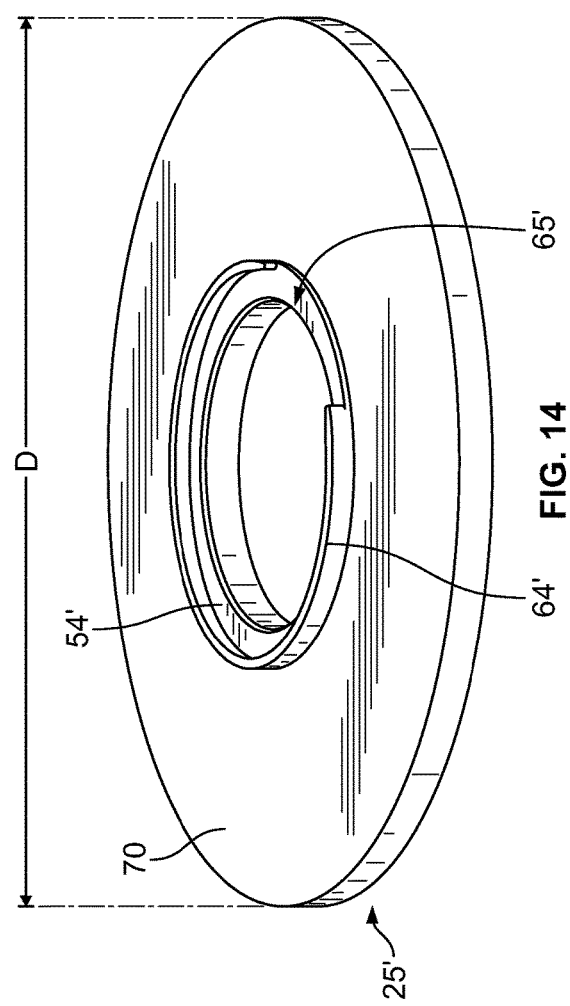
FIG. 14 is a top perspective view of an alternate exchangeable die member according to an aspect of the invention.
Figure 15:
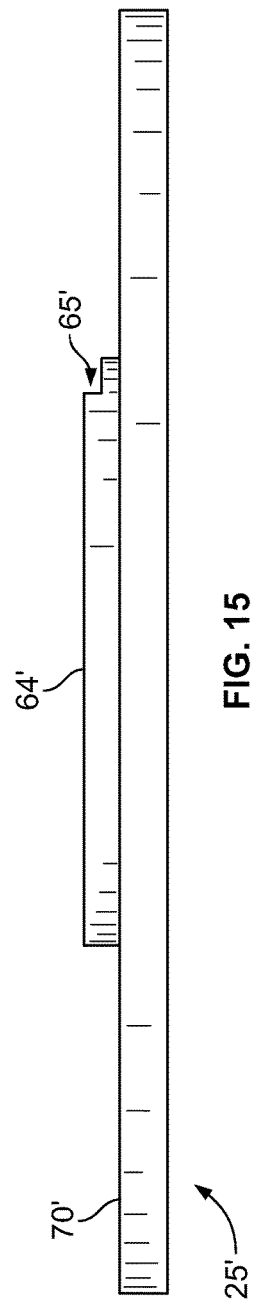
FIG. 15 is a side elevation view of the alternate exchangeable die member shown in FIG. 14.
Figure 16:
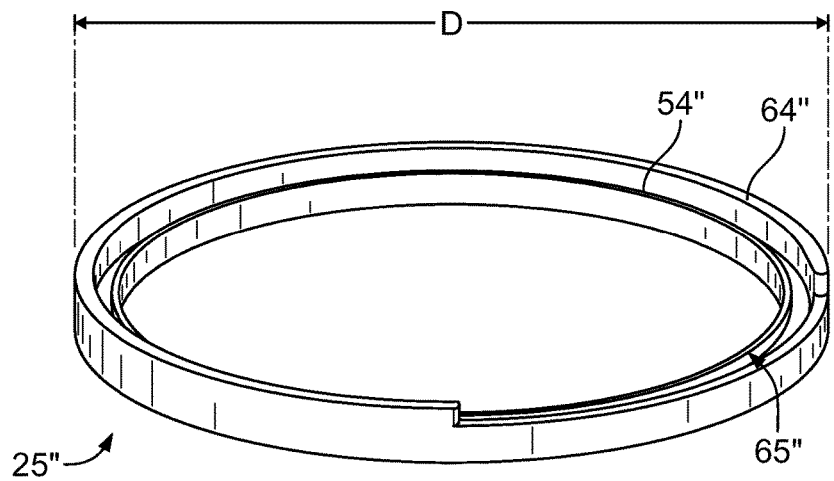
FIG. 16 is a top perspective view of another alternate exchangeable die member according to an aspect of the invention.

In addition to lower die member 25, referred to above and depicted in detail in FIGS. 12-13, device 10 is further equipped with other interchangeable lower die members 25' and 25" depicted in FIGS. 14-15, and FIG. 16, respectively, lower die member 25' being adapted for a smaller diameter container and lower die member 25" for a larger diameter container than lower die member 25. Each lower die member 25, 25', and 25" has the same outer diameter D, approximately equal to the inner diameter D, of support ring 20, permitting the lower dies to interchangeably nest within support ring 20 on a support ring ledge 62, in the manner illustrated for lower die member 25 in FIGS. 1 and 17-19. Further, each lower die member 25, 25', 25" includes a raised positioning ring 64, 64', 64" generally surrounding its respective lower die sealing surface 54, 54', 54", for receiving and retaining a respective cover of a corresponding shape over a respective container flange. Each raised positioning ring 64, 64', 64" includes spaced apart ends which define a respective tab positioning gap 65, 65', 65" to position a tab of a container cover.

Figure 21:
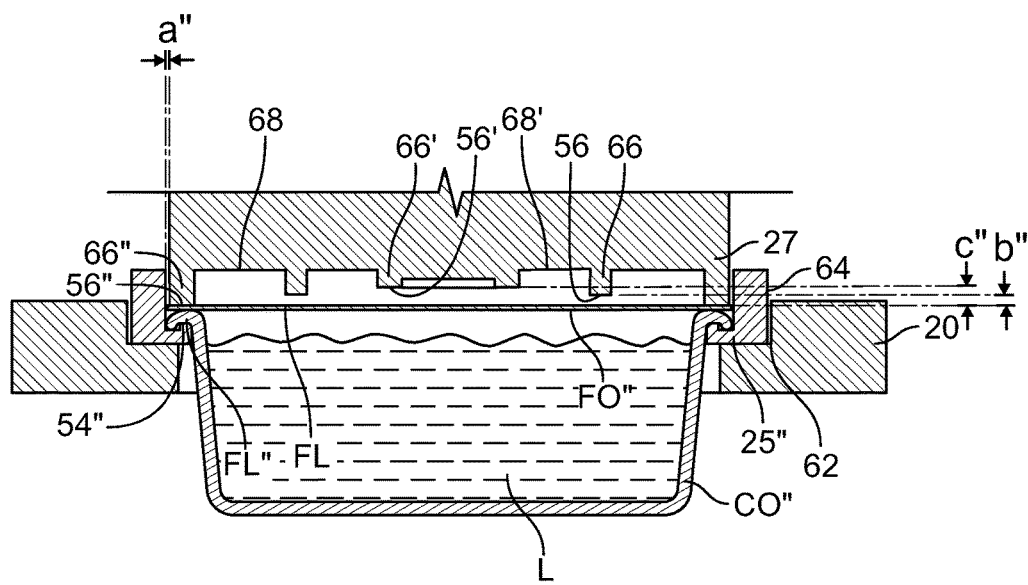
FIG. 21 is a cross-sectional side-elevation view of the components of FIG. 19 with another alternate exchangeable lower die member substituted, shown at another example of a sealing position.

Referring to FIGS. 1, 2A, 2B, 5, and 17-21, features of upper die member 27 adapted to interchangeably cooperate with each lower die member 25, 25', 25" are illustrated. In addition to upper die sealing surface 56 corresponding to lower die sealing surface 54, upper die member 27 also includes a smaller diameter sealing surface 56' and a larger diameter sealing surface 56", respectively corresponding to lower die sealing surfaces 54' and 54". Upper die sealing surfaces 56, 56', 56" are comprised in respective upper die sealing rings 66, 66', 66" sized to fit within lower die positioning rings 64, 64', 64", leaving a transverse clearance (which also may be termed "radial" or "lateral"), indicated in FIGS. 17-19 for lower die positioning ring 64 as clearance "a", to permit relative transverse/radial/lateral play between upper die member 27 and lower die member 25 as they initially come into alignment and as they rotate in tandem about offset axes. Additionally, with reference to FIGS. 18 and 19, lower die member 25 and upper die member 27 are appropriately dimensioned to provide a vertical clearance "b" between upper die sealing surface 56' and foil cover FO, which is particularly important to prevent heat degradation of any printing on foil cover FO in the case of heated upper die member 27, as well as to prevent upper die sealing surface 56' from disturbing the position of foil cover FO; a vertical clearance "c" between lower die positioning ring 64 and a recessed surface 68 of upper die member 27 surrounding upper die sealing ring 66; and a vertical clearance "d" between upper die sealing surface 56" and a base flange 70 of lower die member 25. Similarly, with reference to FIG. 20, a transverse clearance a' is provided between lower die positioning ring 64' and upper die sealing ring 66', a vertical clearance b', is provided between lower die positioning ring 64' and a recessed surface 68' of upper die member 27 surrounding upper die sealing ring 66'; and vertical clearances c' and d' are provided between a base flange 70' of lower die member 25' and upper die sealing surfaces 56 and 56". Finally, as shown in FIG. 21, a transverse clearance a" is provided between positioning ring 64" of lower die member 25" and upper die sealing ring 66" at the outer edge of upper die member 27, and vertical clearances b" and c" are provided between foil cover FO" and upper die sealing surfaces 56 and 56'.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:
1. A container sealing device comprising
   a base;
   a lower die member mounted for generally vertical translation relative to the base between a home position and a lower die sealing position generally below the home position and for pivotal movement, generally about a horizontal lower die pivotal axis, between an initial lower die alignment position at an initial die alignment angle and a sealing position at a sealing angle;
   a biasing mechanism to provide a biasing force to bias the lower die member upwardly toward the home position when the lower die member is displaced below the home position; and
   an upper die member mounted for pivotal movement relative to the device support member about an upper die pivotal axis at least substantially parallel to and spaced apart from the lower die pivotal axis, the upper die member being pivotable to and from an upper die open position and an initial upper die alignment position, the upper die open position being at an inclined, open upper die angle higher than said initial die alignment angle, to permit placement of a peripheral container flange of a container and a cover for the container overlapping at least a portion of the container flange onto the lower die member, and removal of the sealed container comprising the container flange and cover from the lower die member, and the initial upper alignment position being at said initial die alignment angle; and the upper die member being pivotable to and from the initial upper die alignment position and an upper die sealing position at a generally horizontal sealing angle lower than said initial die alignment angle, at which the upper die member substantially uniformly engages the lower die member in the lower die sealing position, wherein when a container flange and cover are disposed between an upper die sealing surface of the upper die member and a lower die sealing surface of the lower die member, a force from the biasing mechanism is applied to provide generally uniform clamping pressure to the container flange and cover between the upper and lower die sealing surfaces to permit uniform sealing of the cover to the container flange, the upper die member in a lowering pivotal movement from the upper die open position toward the upper die alignment position being configured to initially engage part of the lower die member when the lower die member is not disposed at the initial die alignment angle upon initial contact with the upper die member during said lowering pivotal movement of the upper die member, and to impart movement to the initially engaged part of the lower die member to impel the lower die member to pivot to the initial die alignment angle as said lowering pivotal movement of the upper die member approaches the initial die alignment angle.

2. The sealing device of claim 1, wherein the upper die sealing surface is heated.

3. The sealing device of claim 1, the biasing mechanism configured to apply negligible clamping pressure between the upper and lower die sealing surfaces at the initial die alignment angle compared to the generally uniform clamping pressure applied to the container flange and cover at the sealing position.

4. The sealing device of claim 1, further comprising a lower die support member movably mounted in the device to retain said lower die member through said movements of said lower die member.

5. The sealing device of claim 4, the lower die member being removably retained in said lower die support member to permit manual exchange of the lower die member for at least one alternate lower die member.

6. The sealing device of claim 4, the lower die support member being removably connected to said base for toolless removal and reassembly.

7. The sealing device of claim 5, the upper die member comprising a plurality of upper die sealing surfaces, the upper die sealing surfaces configured to alternately engage complementary respective sealing surfaces of said lower die member and said at least one alternate lower die member.

8. The sealing device of claim 7, said plurality of upper die sealing surfaces being stepped, non-overlapping, narrow-banded, generally planar and generally parallel surfaces, each upper die sealing surface at least substantially surrounding an open interior area in its respective plane, and the surfaces having a range of sizes, the open interior area defined by each larger upper die sealing surface generally overlapping and being disposed lower relative to the upper die member than any smaller upper die sealing surface, to avoid contact between said any smaller upper die sealing surface and a container cover in contact with said larger upper die sealing surface.

9. The sealing device of claim 6, further comprising at least one lower die support member mounting bracket slidingly received by and frictionally retained with respect to a wall of the countertop-engaging device support member, said biasing mechanism being disposed to transmit said biasing force between said mounting bracket and said lower die support member.

10. The sealing device of claim 1, said lower die member further comprising a lower die positioning ring protruding upwardly from the lower die member and having an inner wall with a perimeter complementary to an outer perimeter of a container cover to be sealed, to receive and restrict transverse movement of said container cover.

11. The sealing device of claim 10, said upper die sealing surface being comprised in an upper die sealing ring protruding downwardly from the upper die member; and the inner wall of said lower die positioning ring generally surrounding an area containing an outer wall of said upper die sealing ring to define a transverse clearance between the lower die positioning ring and the upper die sealing ring, to permit a limited amount of relative transverse movement of the upper and lower die members when the upper and lower die members are aligned.

12. The sealing device of claim 10, said lower die positioning ring having spaced apart ends defining a tab positioning gap sized and shaped to receive and retain a tab of said cover at a fixed angular position with respect to a generally vertical axis.

13. The sealing device of claim 1 wherein the biasing mechanism comprises a helical spring.

14. The sealing device of claim 13 wherein the helical spring is deployed in compression, a lower end of the helical spring disposed to transmit a generally downward force to a generally upwardly facing surface supported in fixed relation to the base, and an upper end of the helical spring disposed to transmit a generally upward force to a generally downwardly facing surface of the lower die support member, at or near and generally perpendicularly to said lower die pivotal axis.

15. The sealing device of claim 13, wherein the biasing mechanism comprises at least two helical springs spaced apart along said lower die pivotal axis.

* * * * *